(12) United States Patent
Fox et al.

(10) Patent No.: US 10,723,441 B2
(45) Date of Patent: Jul. 28, 2020

(54) HIGH-SPEED-DEPLOYED, DRUM-BRAKE, INERTIA DISK FOR RACK AND PINION ROTATIONAL INERTER

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 15/952,407

(22) Filed: Apr. 13, 2018

(65) Prior Publication Data

US 2019/0315454 A1 Oct. 17, 2019

(51) Int. Cl.
*B64C 13/34* (2006.01)
*F16D 51/20* (2006.01)
(Continued)

(52) U.S. Cl.
CPC .............. *B64C 13/34* (2013.01); *F16D 51/20* (2013.01); *F16D 59/00* (2013.01); *F16F 7/10* (2013.01); *F16F 2222/08* (2013.01)

(58) Field of Classification Search
CPC ......... B64C 13/34; F16D 51/20; F16D 59/00; F16D 2129/046; F16D 2121/14;
(Continued)

(56) References Cited

U.S. PATENT DOCUMENTS 2,660,028 A 11/1953 Geyer
2,679,827 A 6/1954 Perdue
(Continued)

FOREIGN PATENT DOCUMENTS

DE 102007029358 A1 1/2009
EP 1500825 A2 1/2005
(Continued)

OTHER PUBLICATIONS

European Search Report dated Sep. 6, 2019 in re EP application No. 19169010.6 filed Apr. 12, 2019.
(Continued)

*Primary Examiner* — Valentina Xavier
(74) *Attorney, Agent, or Firm* — Coats + Bennett, PLLC

(57) ABSTRACT

A dual rack and pinion rotational inerter, configured to dampen the flutter of a flight control member of an aircraft, includes an inertial wheel and a brake member disposed on an inertial wheel. The brake member moves between a retracted position and a deployed position based on a rotational velocity of the inertial wheel. The brake member moves to the retracted position when the rotational velocity of the inertial wheel is slower than a predetermined threshold velocity to allow the rotation of the inertial wheel. When the rotational velocity of the inertial wheel is at least as fast as the predetermined threshold velocity, however, the brake member deploys to yieldingly resist the rotation of the inertial wheel. In either position, the inertial wheel causes the inerter to dampen the flutter.

20 Claims, 6 Drawing Sheets

(51) Int. Cl.
  *F16F 7/10* (2006.01)
  *F16D 59/00* (2006.01)

(58) Field of Classification Search
  CPC ........ F16F 7/10; F16F 2222/08; F16F 7/1022; F16F 7/1005
  See application file for complete search history.

(56) References Cited

U.S. PATENT DOCUMENTS

| | | |
|---|---|---|
| 3,253,613 A | 5/1966 | Richolt |
| 3,585,902 A | 6/1971 | Anderson |
| 4,932,311 A | 6/1990 | Mibu et al. |
| 5,074,495 A | 12/1991 | Raymond |
| 5,144,851 A | 9/1992 | Grimm et al. |
| 5,937,646 A | 8/1999 | Zakula |
| 6,352,018 B1 | 3/2002 | Krisher |
| 6,578,425 B2 | 6/2003 | Hickman |
| 7,059,563 B2 | 6/2006 | Huynh |
| 8,109,163 B2 | 2/2012 | Hudson et al. |
| 8,359,851 B2 | 1/2013 | Haase |
| 8,418,956 B2 | 4/2013 | Fukui |
| 8,499,552 B2 | 8/2013 | Kauss et al. |
| 9,334,914 B2 | 5/2016 | Gartner |
| 9,618,102 B2 | 4/2017 | Hirai |
| 9,709,052 B1 | 7/2017 | Tanju et al. |
| 9,823,670 B2 | 11/2017 | Wilson et al. |
| 9,969,233 B2 | 5/2018 | Leglize |
| 9,994,304 B2 | 6/2018 | Ito |
| 10,384,764 B2 * | 8/2019 | Blanc ................ F15B 13/01 |
| 2007/0194738 A1 | 8/2007 | Hirai |
| 2015/0059325 A1 | 3/2015 | Knussman et al. |
| 2015/0114151 A1 | 4/2015 | Hirai |
| 2016/0091004 A1 | 3/2016 | Gomm et al. |
| 2016/0096617 A1 | 4/2016 | Ito |
| 2017/0233064 A1 | 8/2017 | McCormick et al. |
| 2017/0335916 A1 | 11/2017 | Fox et al. |
| 2018/0128359 A1 * | 5/2018 | Fida ................ F16H 33/02 |
| 2018/0135717 A1 | 5/2018 | Fox et al. |
| 2018/0156293 A1 | 6/2018 | Fox et al. |

FOREIGN PATENT DOCUMENTS

| | | |
|---|---|---|
| EP | 1710446 A2 | 10/2006 |
| EP | 3067252 A1 | 9/2016 |

OTHER PUBLICATIONS

European Search Report dated Sep. 3, 2019 in re EP application No. 19167685.7 filed Apr. 5, 2019.

Freescale Semiconductor, Inc., "M68HCO8 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.

Avago Technologies, "Optical Mouse Sensors," AV00-0115EN, May 14, 2007, pp. 1-24.

* cited by examiner

US 10,723,441 B2

HIGH-SPEED-DEPLOYED, DRUM-BRAKE, INERTIA DISK FOR RACK AND PINION ROTATIONAL INERTER

TECHNICAL FIELD

The present disclosure relates generally to aircraft flight control systems, and more particularly to a rack and pinion rotational inerter configured to control the flight control members of an aircraft.

BACKGROUND

Aircraft include one or more movable flight control members to permit pilots and/or on-board systems to adjust and control the attitude of the aircraft during flight. Some typical flight control members found on aircraft include, but are not limited to, ailerons on the wings for roll control, elevators on the horizontal tail of the empennage for pitch control, a rudder on the vertical tail of the empennage for yaw control, as well as various other movable control surfaces.

The movement of such flight control members is typically effected by one or more actuators mechanically coupled between a base on the aircraft (e.g., a wing spar) and the flight control member. In cases where a given flight control member is considered flutter critical, a regulatory authorities mandate the use of at least two actuators. In some cases, inerter systems are utilized to dampen movement of such flight control members thereby mitigating the criticality of such flutter critical flight control members and permitting the use of only a single actuator.

BRIEF SUMMARY

Aspects of the present disclosure relate to an apparatus and method for damping flutter of a flutter critical flight control member, and to an aircraft equipped with such an apparatus. In one aspect, an inertial wheel assembly for a dual rack and pinion rotational inerter configured to control movement of a flight control member on an aircraft comprises a housing and an inertial wheel. The inertial wheel is disposed within the housing and is operatively connected to an axle of the dual rack and pinion rotational inerter. The inertial wheel is configured to dampen flutter of the flight control member and comprises a trigger member configured to pivot between a first position and a second position based on a rotational velocity of the inertial wheel, and a brake member operatively coupled to the trigger member. The brake member is configured to move between a retracted position in which the brake member is spaced away from the housing when the trigger member is in the first position, and a deployed position in which the brake member contacts the housing when the trigger member is in the second position.

In one aspect, the trigger member is configured to pivot to, and persist in, the first position when the rotational velocity of the inertial wheel is slower than a predetermined velocity threshold, and pivot to, and persist in, the second position when the rotational velocity of the inertial wheel is at least as fast as the predetermined velocity threshold.

Additionally, in one aspect, the inertial wheel further comprises a biasing member operatively coupling the brake member to the trigger member. In this aspect, the inertial wheel is further configured to bias the brake member into the retracted position when the trigger member pivots to the first position, and bias the brake member into the deployed position when the trigger member pivots to the second position.

In one aspect, the inertial wheel further comprises a stop member configured to engage the brake member when the trigger member is in the first position and the brake member is in the retracted position, and engage the biasing member when the trigger member is in the second position and the brake member is in the deployed position.

In one aspect, the inertial wheel further comprises a balancing mass configured to balance the rotation of the inertial wheel about a center of gravity of the inertial wheel.

In one aspect, the inertial wheel assembly further comprises a brake lining disposed on an interior surface of the housing. In these aspects, the brake member is spaced away from the brake lining when the brake member is in the retracted position, and contacts the brake lining when the brake member is in the deployed position.

In one aspect, the brake member yieldingly resists the rotation of the axle when the brake member is in the deployed position.

In one aspect, the trigger member moves the brake member to the deployed position responsive to a flight control actuator disconnecting from the flight control member with the dual rack and pinion rotational inerter remaining connected to the flight control member.

In one aspect, the inertial wheel assembly comprises first and second inertial wheel assemblies. The first inertial wheel assembly is disposed adjacent a first side of the dual rack and pinion rotational inerter, and the second inertial wheel assembly is disposed adjacent a second side of the dual rack and pinion rotational inerter opposite the first side.

According to one aspect, an aircraft comprises a dual rack and pinion rotational inerter coupled between a support structure of the aircraft and a flight control member comprising a flight control surface, and an inertial wheel assembly operatively coupled to a side of the rack and pinion rotational inerter. In these aspects, the inertial wheel assembly comprises an inertial wheel disposed within a housing, a trigger member disposed on the inertial wheel, and a brake member operatively coupled to the trigger member. The inertial wheel is operatively connected to an axle of the dual rack and pinion rotational inerter, and is configured to dampen flutter of the flight control member. The trigger member is configured to pivot between a first position and a second position based on a rotational velocity of the inertial wheel. The brake member is configured to move between a retracted position away from the housing when the trigger member is in the first position, and a deployed position contacting the housing when the trigger member is in the second position.

In one aspect, the trigger member is configured to pivot to, and persist in, the first position when the rotational velocity of the inertial wheel is slower than a predetermined velocity threshold, and pivot to, and persist in, the second position when the rotational velocity of the inertial wheel is at least as fast as the predetermined velocity threshold.

In one aspect, the inertial wheel assembly further comprises a biasing member operatively coupling the brake member to the trigger member. The biasing member is configured to bias the brake member into the retracted position when the trigger member pivots to the first position, and bias the brake member into the deployed position when the trigger member pivots to the second position.

In one aspect, the aircraft further comprises a brake lining disposed on an interior surface of the housing. The brake member is spaced away from the brake lining in the retracted position, and contacts the brake lining in the deployed position.

In one aspect, the brake member yieldingly resists the rotation of the inertial wheel when the brake member is in the deployed position.

According to one aspect, the present disclosure provides a method of controlling movement of a flight control member on an aircraft comprising a dual rack and pinion rotational inerter and an inertial wheel assembly. The inertial wheel assembly comprises an inertial wheel disposed within a housing, a brake member disposed on the inertial wheel, and a trigger member disposed on the inertial wheel and operatively connected to the brake member. In these aspects, the method comprises, retracting the brake member away from the housing to allow the inertial wheel to rotate responsive to a rotational velocity of the inertial wheel being slower than a predetermined velocity threshold, and deploying the brake member into contact with the housing to yieldingly resist rotation of the inertial wheel responsive to the rotational velocity of the inertial wheel being at least as fast as the predetermined velocity threshold.

In one aspect, the method further comprises pivoting the trigger member to, and persisting the trigger member in, a first position when the rotational velocity of the inertial wheel is slower than the predetermined velocity threshold, and pivoting the trigger member to and persisting the trigger member in, a second position when the rotational velocity of the inertial wheel is at least as fast as the predetermined velocity threshold.

In one aspect, retracting the brake member away from the housing comprises biasing the brake member into the retracted position when the trigger member is pivoted to the first position.

In one aspect, deploying the brake member into contact with the housing comprises biasing the brake member into the deployed position when the trigger member is pivoted to the second position.

In one aspect, retracting the brake member away from the housing comprises retracting the brake member away from a brake lining disposed on an interior surface of the housing, and deploying the brake member into contact with the housing comprises moving the brake member into contact with the brake lining disposed on the interior surface of the housing.

In one aspect, deploying the brake member into contact with the housing further comprises moving the brake member into contact with the housing when a flight control actuator becomes disconnected from the flight control member with the dual rack and pinion rotational inerter remaining connected to the flight control member.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure relate to a dual rack and pinion rotational inerter system for controlling the movement of a flutter critical flight control member on an aircraft. The dual rack and pinion rotational inerter system, which is disposed between a support structure on the aircraft and the flight control member, comprises an inerter having first and second opposing racks, a rotatable pinion gear disposed between the first and second racks, and a pair of inertial wheel assemblies that are aligned with each other and disposed on opposite sides of the inerter. Each inertial wheel assembly further comprises an inertial wheel operatively attached to the pinion gear such that it rotates with the pinion gear.

During normal flight operations, the rotation of the flight control member about its hinge axis causes the first and second racks to move linearly relative to each other along a longitudinal inerter axis. The linear movement, in turn, causes rotational movement of both the pinion and the pair of inertia wheels. However, the rotational movement of the inertia wheels resists the rotation of the pinion gear. By resisting the rotation of the pinion gear, the dual rack and pinion rotational inerter system of the present aspects dampens movement of the flight control member in response to flutter loads exerted on a surface of the flight control member.

There are situations, however, in which the rotation of the inerter wheels can be undesirable. Such situations can exist, for example, when the rotational velocity of one or both of the inerter wheels meets or exceeds a predetermined threshold rotational velocity (i.e., the inerter wheels rotate at least as fast, or faster than, a design limit). In these cases, according to the disclosure, one or more brake members disposed on each of the inerter wheels are deployed to slow or stop the rotation of the inerter wheels. When deployed, the brake members of the present aspects need not prevent all rotation of the inerter wheels, but rather, yieldingly resist the rotation of the inerter wheels. Such "yielding resistance" permits the dual rack and pinion rotational inerter system of the present disclosure to dampen movement of the flight control member, while at the same time preventing damage to the dual rack and pinion rotational inerter system and flight control member.

Figure 1:
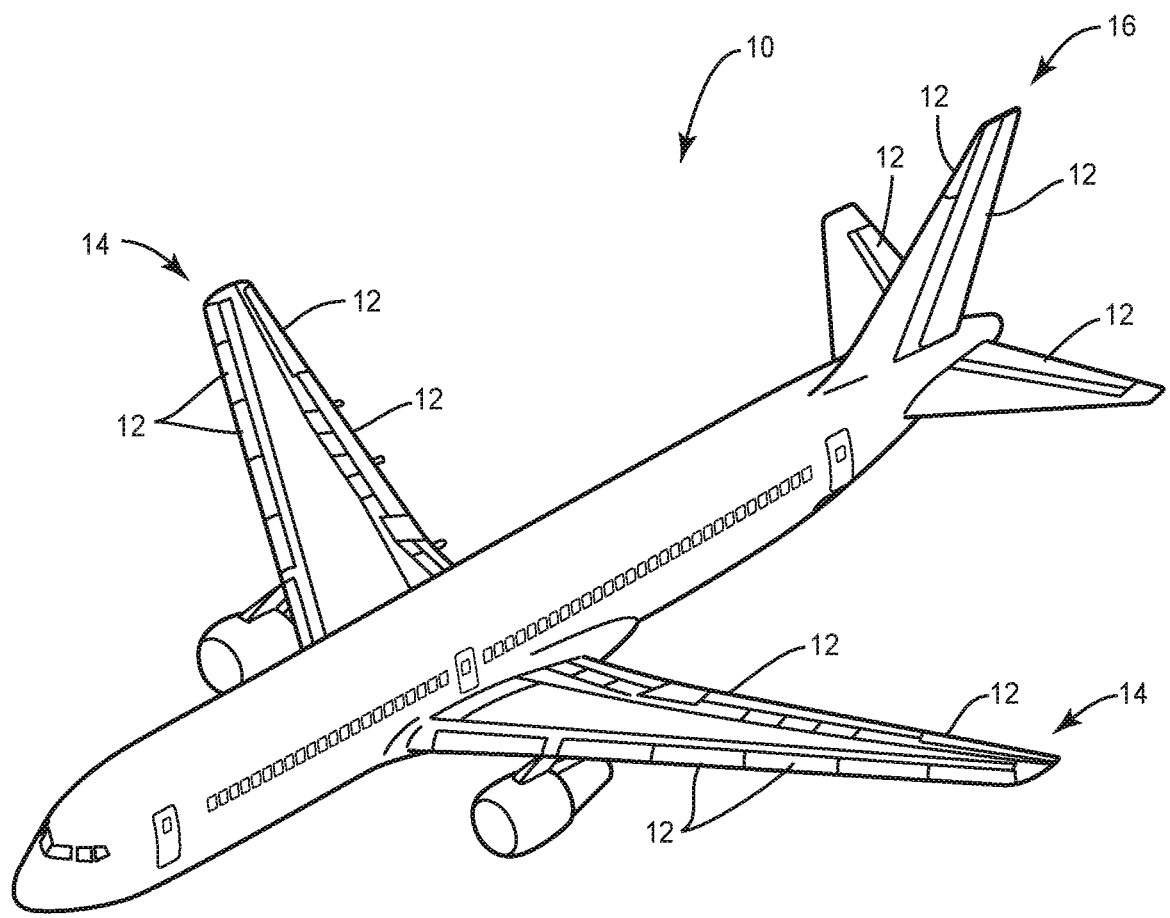
FIG. 1 is a perspective view of an aircraft configured according to one aspect of the present disclosure.

Turning now to the drawings, FIG. 1 illustrates an aircraft 10 configured according to one aspect of the present disclosure. As seen in FIG. 1, a plurality of different types of flight control members 12 are distributed on aircraft 10. By way of non-limiting example, the flight control members 12 can be disposed on the wings 14 or the tail section 16, and can include but are not limited to a rudder, elevators, ailerons, wing leading and trailing edge devices, and spoilers. According to aspects of the present disclosure, the flight control members 12 are movably attached to aircraft 10. During flight, pilots and/or control systems on board the aircraft change the orientation of the flight control members 12 to adjust and control the attitude of the aircraft.

Figure 2:
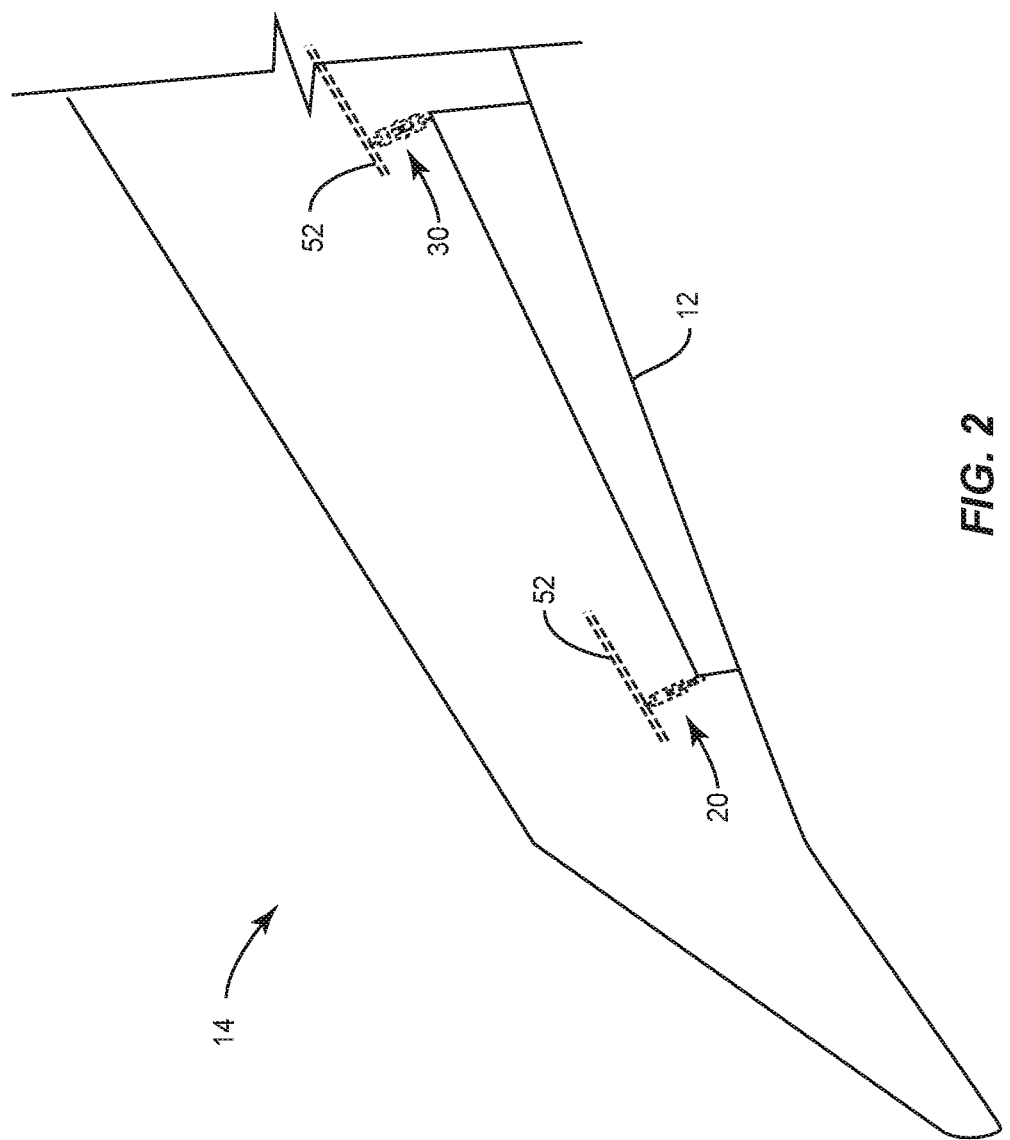
FIG. 2 is a perspective view of an aircraft wing configured with an actuator and a dual rack and pinion rotational inerter system configured according to one aspect of the present disclosure.

FIG. 2 is a top view of a wing 14 illustrating possible placements on aircraft 10 for an actuator 20 configured to control movement of a flutter critical flight control member 12, and a dual rack and pinion rotational inerter system 30 configured to control flutter of the flutter critical flight control member 12 according to one aspect of the present disclosure. As will be readily appreciated by those of ordinary skill in the art, the particular positioning of the actuator 20 and dual rack and pinion rotational inerter system 30 on wing 14 is for illustrative purposes only. Indeed, in other aspects, the actuator 20 and/or the dual rack and pinion rotational inerter system 30 may be disposed on parts of aircraft 10 other than wing 14, such as on the tail section 16, for example, as well as in other positions and orientations. Regardless of the particular placement and orientation, however, both the actuator 20 and the dual rack and pinion rotational inerter system 30 are disposed between a support structure 52 of aircraft 10 and a flight control member 12 such that the dual rack and pinion rotational inerter system 30 is able to dampen movement of the flight control member 12.

Figure 3:
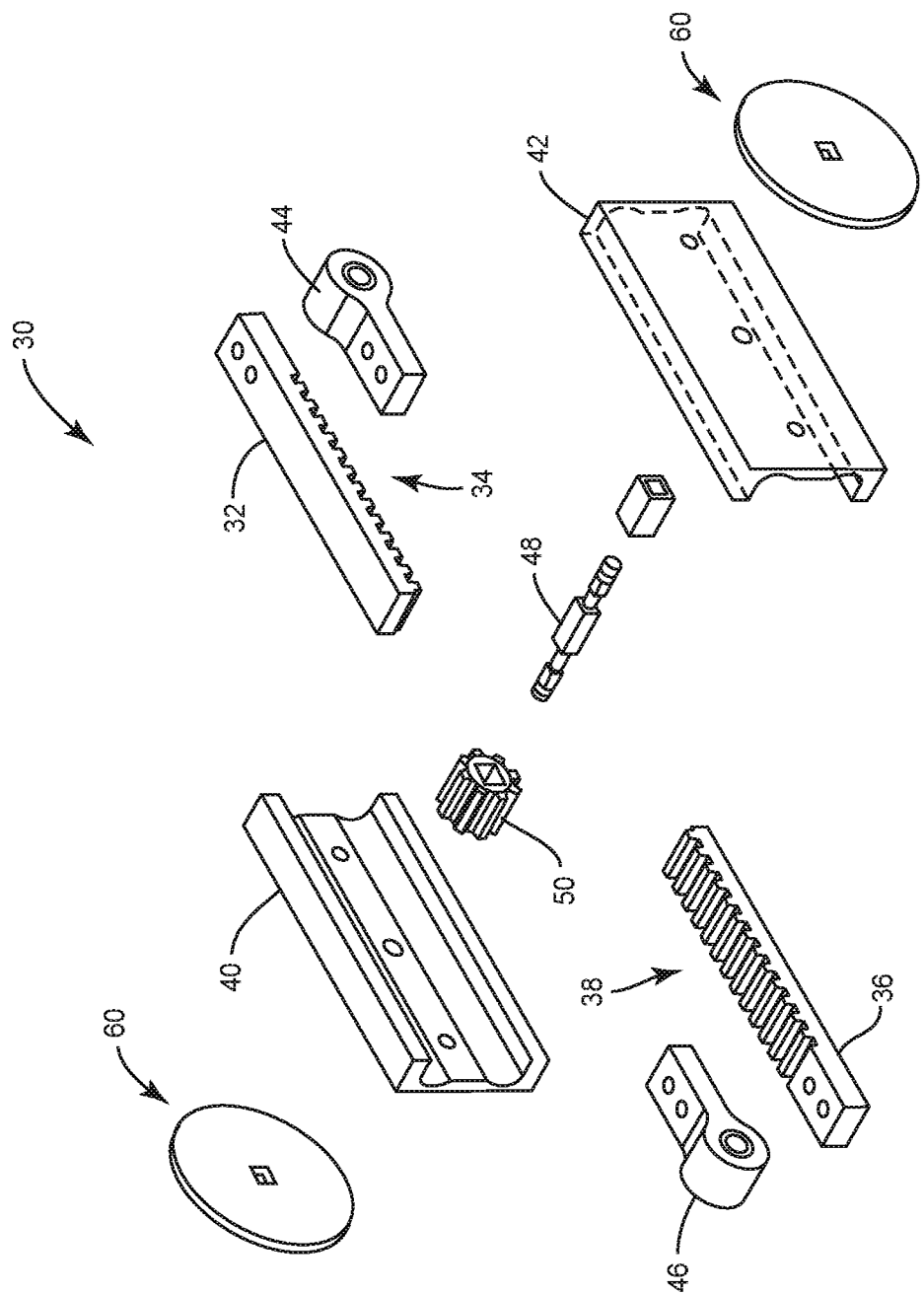
FIG. 3 is an exploded view illustrating component parts of a dual rack and pinion rotational inerter system configured according to one aspect of the present disclosure.

FIG. 3 is an exploded view illustrating some of the component parts of a disassembled dual rack and pinion rotational inerter system 30 according to one aspect of the present disclosure. As seen in FIG. 3, the dual rack and pinion rotational inerter system 30 comprises first and second opposing racks 32, 36. Each rack 32, 36 is a linear gear comprising a respective set of gear teeth 34, 38 that face each other, and are held together by a clamping structure, which in this aspect comprises a multi-part, flexible clamping structure 40, 42. Using any of a variety of known mechanical fasteners, a first terminal 44 is fixedly attached to the first rack 32 and a second terminal 46 is fixedly attached to the second rack 36. As seen later in more detail, the first terminal 44 operatively couples the first rack 32 to the flutter critical flight control member 12, while the second terminal 46 operatively couples the second rack 36 to a support structure 52 (e.g., a wing spar) on aircraft 10.

The dual rack and pinion rotational inerter system 30 also comprises an axle 48, a pinion gear 50 having a plurality of gear teeth, and a pair of inertial wheel assemblies 60. The axle 48 extends continuously through a center opening of pinion gear 50, and through both parts of the flexible clamping structure 40, 42. The inertial wheel assemblies 60 are respectively positioned adjacent to opposite exterior sides of the clamping structure 40, 42, and connected to opposing ends of axle 48. The axle 48, therefore, operatively couples the rotation of the pinion gear 50 and both of the inertial wheel assemblies 60.

Figure 4:
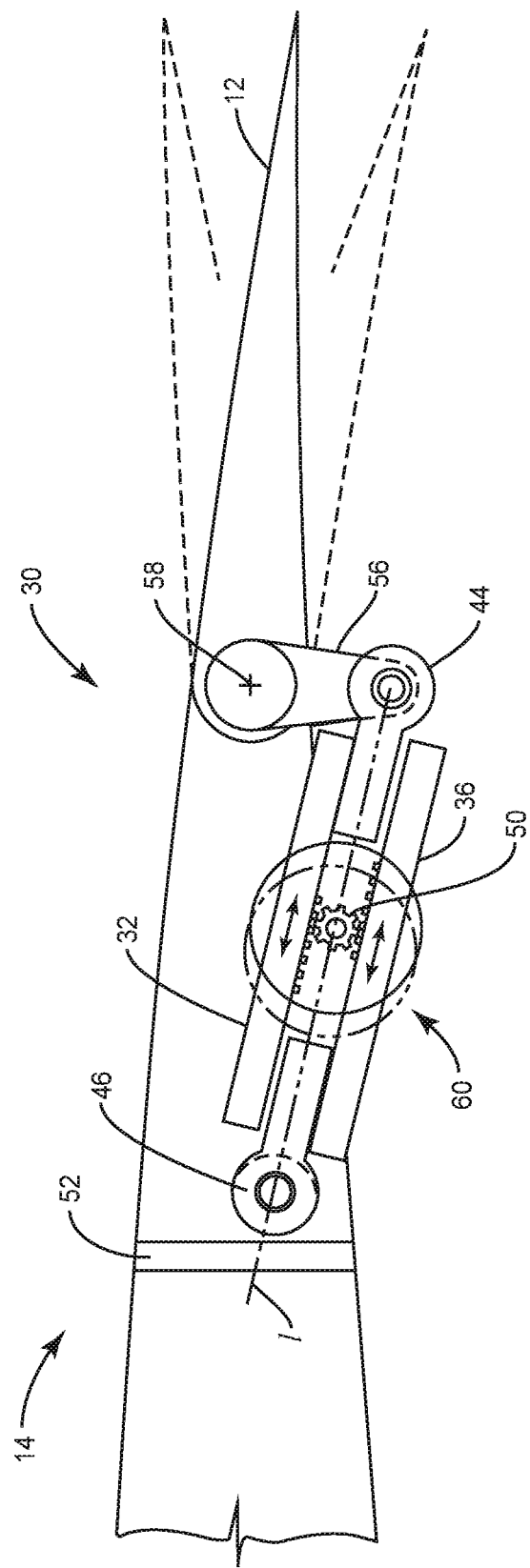
FIG. 4 is a schematic view of a dual rack and pinion rotational inerter system installed on an aircraft between a support structure and a flight control member according to one aspect of the present disclosure.

As stated above, and as illustrated in FIG. 4, one aspect of the present disclosure positions the dual rack and pinion rotational inerter system 30 between a support structure 52 on aircraft 10 (e.g., a wing spar) and a flight control member 12. In this aspect, the first terminal 44 pivotably attaches to one end of a pivot member 56 (e.g., a bell crank), and the second terminal 46 fixedly attaches to the support structure 52 via a bracket 54. So disposed, the dual rack and pinion rotational inerter system 30 dampens flutter movement of the flight control member 12.

More particularly, actuator 20 effects the movement of flight control member 12 about a hinge axis 58 responsive to flight control commands from a pilot or flight control system, for example. The rotational movement of the flight control member 12 causes translational movement, via the pivot member 56, of the first rack 32 relative to the second rack 36 along a longitudinal axis/of the dual rack and pinion rotational inerter system 30. The linear movement of the first and second racks 32, 36, in turn, causes the rotation of pinion gear 50 and the inertial wheel assemblies 60 via axle 48 such that the rotational movement of the inertial wheel assemblies 60 resists the incidental rotation movement of pinion gear 50. This resistance suppresses the flutter movement of the flight control member 12 resulting in the dual rack and pinion rotational inerter system 30 damping the flutter of flight control member 12.

As previously stated, there can be situations in which the rotation of the inerter wheel assemblies 60 is undesirable. By way of example only, one such situation exists when the rotational velocity of one or both of the inerter wheel assemblies 60 meets or exceeds a predetermined threshold rotational velocity, such as a velocity defined as part of an upper or max design constraint. These types of situations can occur, for example, when the axle 48 breaks or fails leaving the inertial wheel assembly 60 to rotate. Therefore, according to aspects of the present disclosure, the inertial wheel assemblies 60 are designed to slow or stop their rotation in situations such as these to prevent damage to the flight control member 12, the dual rack and pinion rotational inerter system 30, and/or the aircraft 10.

Figure 5A:
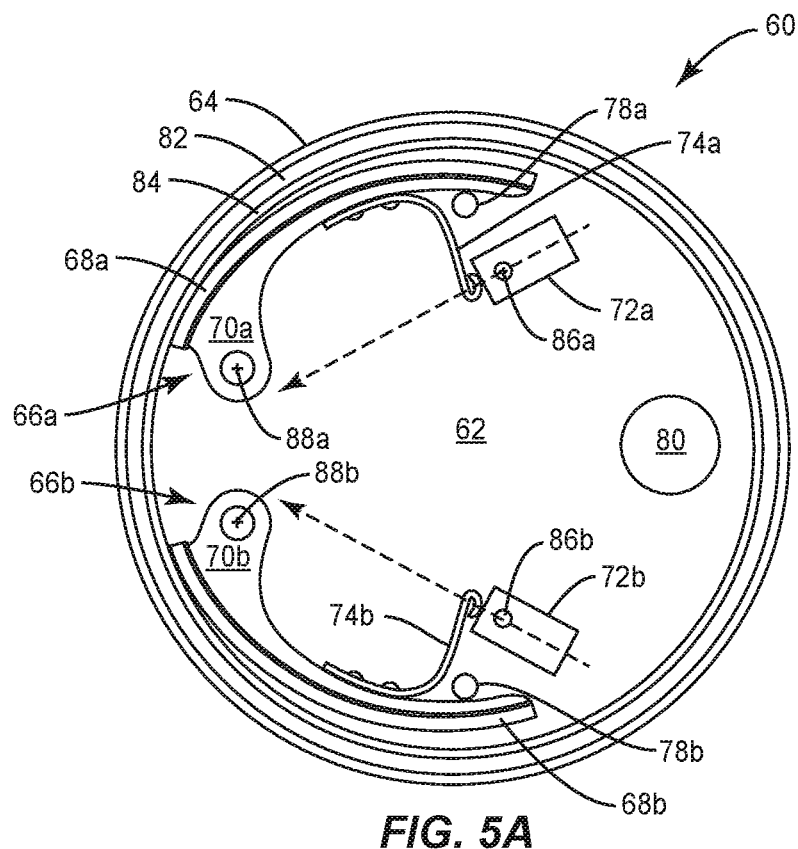
FIG. 5A is a schematic view illustrating a dual rack and pinion rotational inerter system with a brake member in a retracted position according to one aspect of the present disclosure.
Figure 5B:
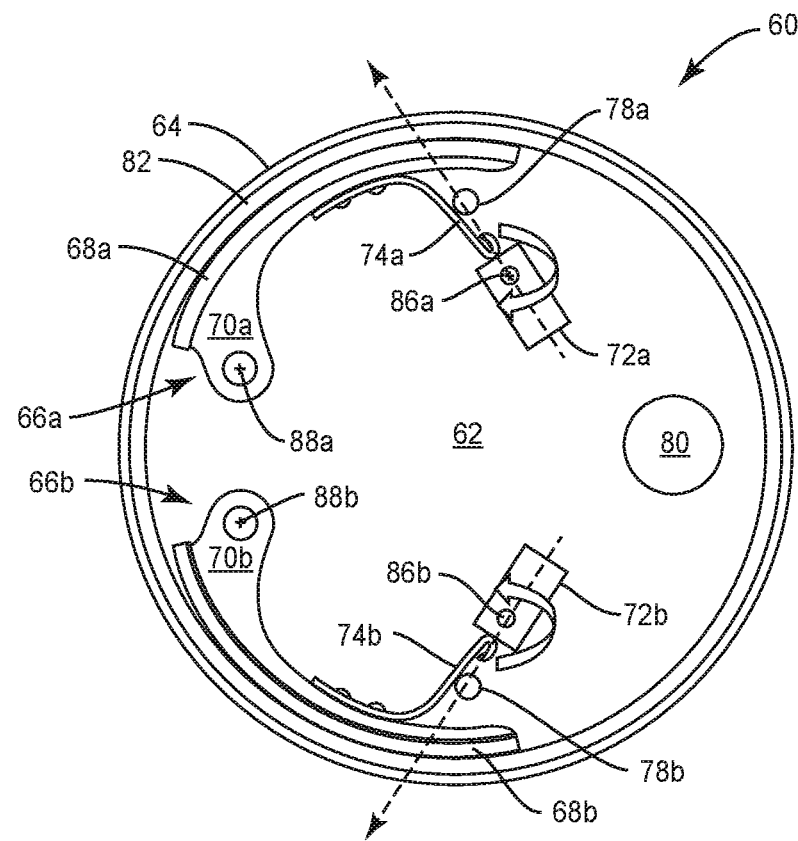
FIG. 5B is a schematic view illustrating a dual rack and pinion rotational inerter system with a brake member in a deployed position according to one aspect of the present disclosure.

FIGS. 5A-5B illustrate a structure for an inertial wheel assembly 60 that functions to slow or stop the rotational movement of the inertial wheel assembly according to one aspect of the present disclosure. For clarity, FIGS. 5A and 5B illustrate components for a single inertial wheel assembly 60. However, aspects of the present disclosure can include more than one inertial wheel assembly 60. In cases where dual rack and pinion inerter 30 comprises more than one inertial wheel assembly 60 (e.g., FIGS. 4-5), those of ordinary skill in the art will appreciate that the inertial wheel assemblies 60 are structured similarly to the inertial wheel assembly 60 seen in FIGS. 5A-5B.

As seen in these figures, each inertial wheel assembly 60 comprises an inertial wheel 62 connected to an end of axle 48 and configured to rotate within a housing 64. A pair of brake members 66a, 66b, each comprising a brake shoe 70a, 70b and a brake pad 68a, 68b, are pivotably attached to the inertial wheel 62 such that each pivots between a retracted position (shown in FIG. 5A) and a deployed position (shown in FIG. 5B) about a respective axis 88a, 88b. In the retracted position, brake members 66a, 66b allow the inertial wheel 62 to rotate with axle 48 thereby resisting the rotation of pinion gear 50 and damping flutter movement of flight control member 12, as previously described. In the deployed position, brake members 66a, 66b are moved to contact the housing 64 such that the rotation of the inertial wheel 62 is slowed or stopped. In this aspect, the brake members 66a, 66b need not completely prevent the rotational movement of the inertial wheel 62 when in the deployed position. Rather, the brake members 66a, 66b, when deployed, yieldingly resist the rotation of the inertial wheel 62. This "yielding resistance" prevents incidental rotational movement of pinion gear 50, while at the same time allowing actuator 20 to overcome the braking torque if needed.

Inertial wheel assembly 60 also comprises a balancing mass 80, a pair of pivotable trigger members 72a, 72b, a pair of biasing members 74a, 74b operatively connecting a respective brake member 66a, 66b with a corresponding trigger member 72a, 72b, and a stop pin 78a, 78b. The balancing mass 80 comprises a weight disposed on inertial wheel 62 that balances the rotation of inertial wheel 62 about its center of gravity. The trigger members 72a, 72b pivot about a respective axis 86a, 86b between first and second positions based on a rotational velocity of inertial wheel 62. Particularly, when the rotational velocity of the inertial wheel 62 is slower than the predetermined threshold rotational velocity, the trigger members 72a, 72b pivot to, and persist in, the first position (FIG. 5A) such that the biasing members 74a, 74b biases the brake members 66a, 66b away from the housing 64. In this aspect, a gap 84 is present between some or all of the brake pads 68a, 68b and housing 64 to allow the inertial wheel 62 to rotate. When the rotational velocity of the inertial wheel 62 meets or exceeds the predetermined threshold rotational velocity, centripetal force causes the trigger members 72a, 72b to pivot to, and persist in, the second position (FIG. 5B) such that the biasing members 74a, 74b biases the brake members 66a, 66b into contact with the housing 64. In this position, the biasing members 74a, 74b contacts a corresponding stop pin 78a, 78b, which prevents trigger members 72a, 72b from over pivoting, and some or all of the brake pads 68a, 68b contacts the housing 64 thereby yieldingly resisting the rotation of inertial wheel 62.

In some aspects, brake pads 68a, 68b contact the interior surface of housing 64 directly. However, in other aspects, a brake lining 82 is disposed on the interior surface of housing 64. In these latter aspects, some or all of the brake pads 68a, 68b directly contact the brake lining 82 rather than the interior surface of the housing 64. Regardless of whether a brake lining 82 exists, though, the brake members 66a, 66b move between the retracted position and the deployed position responsive to the rotational velocity of the inertial wheel 62. In the retracted position, the brake members 66a, 66b are spaced-away from the housing 64 thereby allowing the inertial wheel 62 to rotate to resist the rotational movement of pinion gear 50 and dampening flutter of the flight control member 12. In the deployed position, brake members 66a, 66b are biased into contact with the interior surface of housing 64, or if it exists, brake lining 82, thereby yieldingly resisting the rotation of inertial wheel 62.

Figure 6:
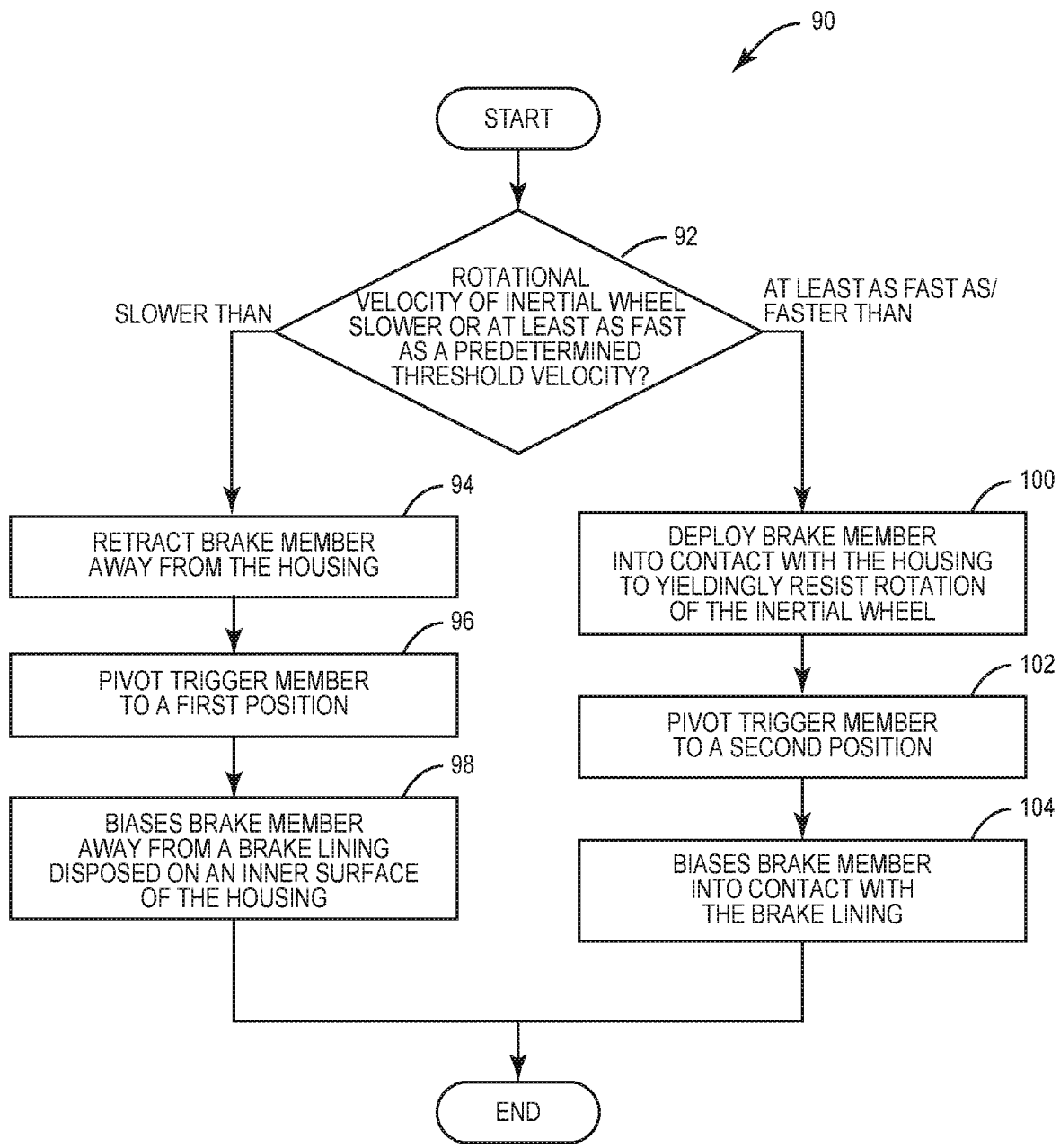
FIG. 6 is a flow diagram illustrating a method of operating a dual rack and pinion rotational inerter system to control movement of a flutter critical flight control member on an aircraft according to one aspect of the present disclosure.

FIG. 6 is a flow diagram illustrating a method 90 of operating a dual rack and pinion rotational inerter system 30 to control movement (e.g., dampen flutter) of a flutter critical flight control member 12 on aircraft 10 according to one aspect of the present disclosure. In this aspect, it is assumed that a brake lining 82 is disposed on the interior surface of housing 64.

As seen in FIG. 6, the rotational velocity of inertial wheel 62 is first determined and compared to a predetermined threshold velocity (box 92). In one aspect, the predetermined threshold velocity defines a design constraint associated with the inertial wheel assembly 60, and the rotational velocity of the inertial wheel 62 is determined using one or more sensors. Provided the comparison reveals that the rotational velocity of inertial wheel 62 is slower than the predetermined threshold velocity, the brake members 66a, 66b retract away from housing 64 (box 94). More specifically, as seen in FIG. 5A, the trigger members 72a, 72b pivot about their respective axis 86a, 86b to a first position (box 96). The trigger members 72a, 72b persist or remain in the first position so long as the rotational velocity of the inertial wheel 62 remains slower than the predetermined threshold velocity. Such pivoting rotation is caused, in part, by the biasing force of biasing members 74a, 74b. In pivoting to the first position, the biasing members 74a, 74b move some or all of brake pads 68a, 68b of brake members 66a, 66b out of contact with the brake lining 82 (box 98).

Provided the comparison reveals that the rotational velocity of inertial wheel 62 is as least as fast as, or faster than, the predetermined threshold velocity, however, brake members 66a, 66b are deployed into direct contact with the brake lining 84 to yieldingly resist the rotational movement of inertial wheel 62 (box 100). More specifically, as seen in FIG. 5B, the trigger members 72a, 72b pivot about their respective axis 86a, 86b to a second position (box 102). The trigger members 72a, 72b persist or remain in the second position so long as the rotational velocity of the inertial wheel 62 remains at least as fast as, or faster than, the predetermined threshold velocity. The pivoting rotation causes biasing members 74a, 74b to bias a corresponding brake member 66a, 66b towards the interior of housing 64, and thus, some or all of brake pads 68a, 68b into contact with brake lining 84. In this deployed position, the brake members 66a, 66b yieldingly resist the rotation of the inertial wheel 62, as previously described (box 104). Those skilled in the art will readily appreciate that the steps detailed with respect to method 90 continue to occur while aircraft 10 is in flight.

In one aspect, the pivoting of the trigger members 72a, 72b between the first and second positions is based on centripetal force. Particularly, as long as the rotational velocity of the inertial wheel 62 remains slower than the predetermined rotational threshold velocity, the trigger members 72a, 72b pivot to, and remain in, the first position. However, when the rotational velocity of inertial wheel 62 becomes at least as fast as, or faster than, the predetermined rotational threshold velocity, the resultant centripetal force of inertial wheel 62 causes the trigger members 72a, 72b to pivot to the second position. The trigger members 72a, 72b remain in this second position until the rotational velocity of the inertial wheel 62 slows to less than the predetermined rotational threshold velocity.

Aspects of the present disclosure further include various methods and processes, as described herein, implemented using various hardware configurations configured in ways that vary in certain details from the broad descriptions given above. For example, the dual rack and pinion rotational inerter system 30 of the present disclosure provides benefits that conventional actuator systems do not provide, or are not capable of providing. For example, the dual rack and pinion rotational inerter system 30 of the present aspects creates or contributes to a system that beneficially allows for significant benefits on aircraft 10 by reducing the number of actuators 20 that must be used on aircraft 10. Because the dual rack and pinion rotational inerter system 30 controls flutter and is utilized in at least some aspects on so-called flutter-critical flight control members, fewer actuators 20 are needed on aircraft 10. This results in a significant cost reduction in the manufacture of aircraft 10. This also results in a savings in aircraft weight, which means the cost to operate the aircraft 10 is also positively affected. Further, because there are fewer actuators 20 on aircraft 10, the load on the aircraft engines and the hydraulic system that drives the actuators 20 is also significantly reduced.

Additionally, the present disclosure describes the foregoing aspects in the context of an aircraft 10. However, those of ordinary skill in the art will readily appreciate that this is for illustrative purposes only, and that the aspects described herein are not limited solely to use in aircraft. Rather, the previously described aspects can be implemented on other types of vehicles to achieve the same or similar benefits.

Such vehicles include, but are not limited to, manned and unmanned automobiles, manned and unmanned aircraft, manned and unmanned rotorcraft, manned and unmanned spacecraft such as satellites, rockets, and missiles, manned and unmanned surface water borne craft, manned and unmanned sub-surface water borne craft, and the like, as well as combinations thereof.

Therefore, the foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. An inertial wheel assembly for a dual rack and pinion rotational inerter configured to control movement of a flight control member on an aircraft, the inertial wheel assembly comprising:
    a housing; and
    an inertial wheel disposed within the housing and operatively connected to an axle of the dual rack and pinion rotational inerter, wherein the inertial wheel is configured to dampen flutter of the flight control member and comprises:
        a trigger member configured to pivot between a first position and a second position based on a rotational velocity of the inertial wheel; and
        a brake member operatively coupled to the trigger member and configured to move between a retracted position in which the brake member is spaced away from the housing when the trigger member is in the first position, and a deployed position in which the brake member contacts the housing when the trigger member is in the second position.

2. The inertial wheel assembly of claim 1 wherein the trigger member is configured to:
    pivot to, and persist in, the first position when the rotational velocity of the inertial wheel is slower than a predetermined velocity threshold; and
    pivot to, and persist in, the second position when the rotational velocity of the inertial wheel is at least as fast as the predetermined velocity threshold.

3. The inertial wheel assembly of claim 2 wherein the inertial wheel further comprises a biasing member operatively coupling the brake member to the trigger member and configured to:
    bias the brake member into the retracted position when the trigger member pivots to the first position; and
    bias the brake member into the deployed position when the trigger member pivots to the second position.

4. The inertial wheel assembly of claim 3 wherein the inertial wheel further comprises a stop member configured to:
    engage the brake member when the trigger member is in the first position and the brake member is in the retracted position; and
    engage the biasing member when the trigger member is in the second position and the brake member is in the deployed position.

5. The inertial wheel assembly of claim 1 wherein the inertial wheel further comprises a balancing mass configured to balance rotation of the inertial wheel about a center of gravity of the inertial wheel.

6. The inertial wheel assembly of claim 1 further comprising a brake lining disposed on an interior surface of the housing, and wherein the brake member is spaced away from the brake lining when the brake member is in the retracted position, and contacts the brake lining when the brake member is in the deployed position.

7. The inertial wheel assembly of claim 1 wherein the brake member yieldingly resists rotation of the axle when the brake member is in the deployed position.

8. The inertial wheel assembly of claim 1 wherein the trigger member moves the brake member to the deployed position responsive to a flight control actuator disconnecting from the flight control member with the dual rack and pinion rotational inerter remaining connected to the flight control member.

9. The inertial wheel assembly of claim 1 wherein the inertial wheel assembly comprises first and second inertial wheel assemblies with the first inertial wheel assembly being disposed adjacent a first side of the dual rack and pinion rotational inerter, and the second inertial wheel assembly being disposed adjacent a second side of the dual rack and pinion rotational inerter opposite the first side.

10. An aircraft comprising:
    a dual rack and pinion rotational inerter coupled between a support structure of the aircraft and a flight control member comprising a flight control surface; and
    an inertial wheel assembly operatively coupled to a side of the rack and pinion rotational inerter and comprising:
        an inertial wheel disposed within a housing and operatively connected to an axle of the dual rack and pinion rotational inerter, wherein the inertial wheel is configured to dampen flutter of the flight control member;
        a trigger member disposed on the inertial wheel and configured to pivot between a first position and a second position based on a rotational velocity of the inertial wheel; and
        a brake member operatively coupled to the trigger member and configured to move between a retracted position away from the housing when the trigger member is in the first position, and a deployed position contacting the housing when the trigger member is in the second position.

11. The aircraft of claim 10 wherein the trigger member is configured to:
    pivot to, and persist in, the first position when the rotational velocity of the inertial wheel is slower than a predetermined velocity threshold; and
    pivot to, and persist in, the second position when the rotational velocity of the inertial wheel is at least as fast as the predetermined velocity threshold.

12. The aircraft of claim 11 wherein the inertial wheel assembly further comprises a biasing member operatively coupling the brake member to the trigger member and configured to:
    bias the brake member into the retracted position when the trigger member pivots to the first position; and
    bias the brake member into the deployed position when the trigger member pivots to the second position.

13. The aircraft of claim 10 further comprising a brake lining disposed on an interior surface of the housing, and wherein the brake member is spaced away from the brake lining in the retracted position, and contacts the brake lining in the deployed position.

14. The inertial wheel assembly of claim 10 wherein the brake member yieldingly resists rotation of the inertial wheel when the brake member is in the deployed position.

15. A method of controlling movement of a flight control member on an aircraft comprising a dual rack and pinion rotational inerter and an inertial wheel assembly, the inertial wheel assembly comprising an inertial wheel disposed within a housing, a brake member disposed on the inertial wheel, and a trigger member disposed on the inertial wheel and operatively connected to the brake member, the method comprising:

responsive to a rotational velocity of the inertial wheel being slower than a predetermined velocity threshold, retracting the brake member away from the housing to allow the inertial wheel to rotate; and responsive to the rotational velocity of the inertial wheel being at least as fast as the predetermined velocity threshold, deploying the brake member into contact with the housing to yieldingly resist rotation of the inertial wheel.

16. The method of claim 15 further comprising:

pivoting the trigger member to, and persisting the trigger member in, a first position when the rotational velocity of the inertial wheel is slower than the predetermined velocity threshold; and pivoting the trigger member to, and persisting the trigger member in, a second position when the rotational velocity of the inertial wheel is at least as fast as the predetermined velocity threshold.

17. The method of claim 16 wherein retracting the brake member away from the housing comprises biasing the brake member into a retracted position when the trigger member is pivoted to the first position.

18. The method of claim 16 wherein deploying the brake member into contact with the housing comprises biasing the brake member into a deployed position when the trigger member is pivoted to the second position.

19. The method of claim 16:

wherein retracting the brake member away from the housing comprises retracting the brake member away from a brake lining disposed on an interior surface of the housing; and wherein deploying the brake member into contact with the housing comprises moving the brake member into contact with the brake lining disposed on the interior surface of the housing.

20. The method of claim 16 wherein deploying the brake member into contact with the housing further comprises moving the brake member into contact with the housing when a flight control actuator becomes disconnected from the flight control member with the dual rack and pinion rotational inerter remaining connected to the flight control member.

* * * * *